United States Patent
Baryudin

(10) Patent No.: US 9,524,113 B2
(45) Date of Patent: Dec. 20, 2016

(54) VARIABLE REDUNDANCY IN A SOLID STATE DRIVE

(71) Applicant: Seagate Technology LLC, Cupertino, CA (US)

(72) Inventor: Leonid Baryudin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 263 days.

(21) Appl. No.: 13/904,362

(22) Filed: May 29, 2013

(65) Prior Publication Data

US 2014/0351486 A1    Nov. 27, 2014

Related U.S. Application Data

(60) Provisional application No. 61/827,190, filed on May 24, 2013.

(51) Int. Cl.
    *G06F 3/06*    (2006.01)

(52) U.S. Cl.
    CPC .......... *G06F 3/0619* (2013.01); *G06F 3/0632* (2013.01); *G06F 3/0688* (2013.01)

(58) Field of Classification Search
    CPC ..... G06F 3/0619; G06F 3/0632; G06F 3/0688
    USPC ................................. 711/103, 114
    See application file for complete search history.

(56) References Cited

U.S. PATENT DOCUMENTS

| | | | | |
|---|---|---|---|---|
| 5,309,451 A | * | 5/1994 | Noya ................... | G06F 12/0866 711/129 |
| 5,392,244 A | * | 2/1995 | Jacobson ............ | G06F 11/1076 711/114 |
| 5,819,310 A | * | 10/1998 | Vishlitzky ........... | G06F 11/2061 711/114 |
| 6,275,898 B1 | * | 8/2001 | DeKoning ............ | G06F 3/0605 711/114 |
| 6,820,182 B1 | * | 11/2004 | Bauman et al. ............... | 711/170 |
| 6,961,815 B2 | * | 11/2005 | Kistler ................... | G06F 1/3203 711/114 |
| 8,447,918 B2 | | 5/2013 | Sprinkle et al. ............... | 711/103 |
| 8,560,801 B1 | * | 10/2013 | Pendharkar ............. | G06F 3/061 711/153 |

(Continued)

OTHER PUBLICATIONS

John Wilkes, Richard Golding, Carl Staelin, and Tim Sullivan. 1996. The HP AutoRAID hierarchical storage system. ACM Trans. Comput. Syst. 14, 1 (Feb. 1996), 108-136. DOI=10.1145/225535. 225539 http://doi.acm.org/10.1145/225535.225539.*

(Continued)

*Primary Examiner* — Kevin Verbrugge
*Assistant Examiner* — Ramon A Mercado
(74) *Attorney, Agent, or Firm* — Christopher P. Maiorana, PC

(57) ABSTRACT

An apparatus comprising a memory and a controller. The memory may be configured to process a plurality of read/write operations. The memory comprises a plurality of memory modules each having a size less than a total size of the memory. The controller is configured to provide a first redundancy scheme when user data occupies less than a preconfigured limit and a second redundancy scheme that protects less than all of the user data when the user data occupies greater than the preconfigured limit.

20 Claims, 3 Drawing Sheets

(56) References Cited

U.S. PATENT DOCUMENTS

| | | | |
|---|---|---|---|
| 8,819,365 B2* | 8/2014 | Shuster | G06F 3/0607 |
| | | | 707/610 |
| 2002/0097626 A1 | 7/2002 | Hidaka | 365/222 |
| 2002/0184442 A1* | 12/2002 | Veitch et al. | 711/114 |
| 2004/0068612 A1* | 4/2004 | Stolowitz | 711/114 |
| 2004/0117549 A1* | 6/2004 | Nakamura | 711/114 |
| 2006/0064550 A1* | 3/2006 | Katsuragi et al. | 711/141 |
| 2006/0161918 A1* | 7/2006 | Giers | 718/102 |
| 2009/0276565 A1* | 11/2009 | Fujibayashi | G06F 3/0613 |
| | | | 711/112 |
| 2010/0088557 A1 | 4/2010 | Weingarten et al. | 714/704 |
| 2010/0287433 A1* | 11/2010 | Mu | 714/746 |
| 2011/0082970 A1* | 4/2011 | Rohleder et al. | 711/104 |
| 2011/0154104 A1* | 6/2011 | Swanson et al. | 714/6.23 |
| 2012/0151254 A1* | 6/2012 | Horn | 714/6.22 |
| 2012/0260146 A1* | 10/2012 | Lee et al. | 714/763 |
| 2013/0054814 A1 | 2/2013 | Das et al. | 709/226 |
| 2013/0227346 A1* | 8/2013 | Lee | 714/6.24 |
| 2014/0040530 A1* | 2/2014 | Chen et al. | 711/103 |

OTHER PUBLICATIONS

Soojun Im; Dongkun Shin, "Flash-Aware RAID Techniques for Dependable and High-Performance Flash Memory SSD," Computers, IEEE Transactions on , vol. 60, No. 1, pp. 80,92, Jan. 2011.*
Mendel Rosenblum and John K. Ousterhout. 1991. The design and implementation of a log-structured file system. In Proceedings of the thirteenth ACM symposium on Operating systems principles (SOSP '91). ACM, New York, NY, USA, 1-15.*

* cited by examiner

VARIABLE REDUNDANCY IN A SOLID STATE DRIVE

This application relates to U.S. Provisional Application No. 61/827,190, filed May 24, 2013, which is hereby incorporated by reference in its entirety.

FIELD OF THE INVENTION

The invention relates to storage devices generally and, more particularly, to a method and/or apparatus for implementing variable redundancy in a solid state drive.

BACKGROUND

Conventional Solid State Drives (SSDs) have used RAID-like redundancy to provide results similar to conventional hard disk drives (HDDs) to recover from certain types of errors. Such redundancy has typically been implemented as "1 die out of n" so that an entire NAND die is consumed by the redundancy. In an 8 NAND die, one of the NAND die is used for RAID-5-like redundancy, reducing capacity by ⅛th, but providing protection against various types of errors.

One issue with redundancy in a SSD is the overall capacity of the drive. Consumers want as much drive space to be available for data as possible. A SSD is normally manufactured with some type of over provisioning, which is the difference between the actual capacity and the advertized capacity. The over provisioning should be kept as low as possible to maintain competitive prices for each unit of available storage.

It would be desirable to implement a controller and/or drive in a solid state drive configuration to reduce over provisioning where user data is fully protected by a first redundancy scheme when user data occupies less than a preconfigured limit and a second redundancy scheme that protects less than all of the user data when the user data occupies drive space greater than the preconfigured limit.

SUMMARY

The invention concerns an apparatus comprising a memory and a controller. The memory may be configured to process a plurality of read/write operations. The memory comprises a plurality of memory modules each having a size less than a total size of the memory. The controller is configured to provide a first redundancy scheme when user data occupies less than a preconfigured limit and a second redundancy scheme that protects less than all of the user data when the user data occupies greater than the preconfigured limit.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Embodiments of the invention include providing elastic (or variable) redundancy that may (i) reduce redundancy overhead by ensuring full redundancy protection up to a certain amount of user data, (ii) bring redundancy support to lower capacity points and/or reduce over provisioning overhead, (iii) provide high "full redundancy" type protection for most SSD applications that do not consume a large amount of the overall physical space, (iv) allow a user configuration for choosing which NAND blocks are protected and/or (v) allow a user configuration for choosing which type of user data is protected.

Figure 1:
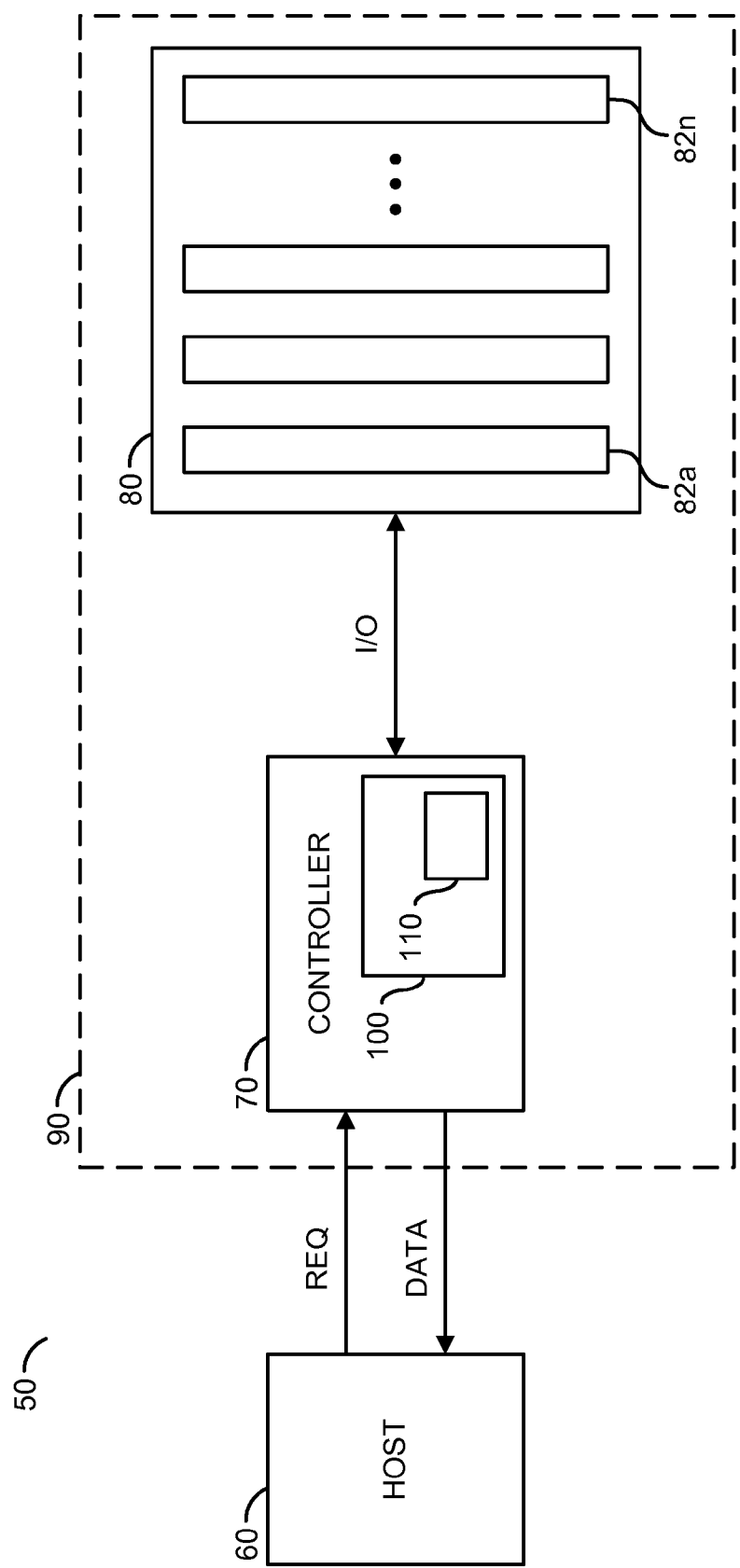
FIG. 1 is a diagram of a context of the invention.

Referring to FIG. 1, a block diagram of an example apparatus 50 is shown. The apparatus 50 generally comprises a block (or circuit) 60, a block (or circuit) 70 and a block (or circuit) 80. The circuit 70 may include a circuit 100. The circuit 100 may be a memory/processor configured to store computer instructions (or firmware) or may be logic. The instructions, when executed, may perform a number of steps. The firmware 100 may include a redundancy control module 110 (to be described in more detail in connection with FIGS. 2 and 3). The redundancy control module 110 may be implemented as part of the firmware 100 or as a separate module. While an example of redundancy implemented in the firmware 100 is shown, the redundancy may be implemented, in another example, in hardware (e.g., logic such as a state machine).

A signal (e.g., REQ) may be generated by the circuit 60. The signal REQ may be received by the circuit 70. The signal REQ may be a request signal that may be used to access data from the circuit 80. A signal (e.g., I/O) may be generated by the circuit 70 to be presented to/from the circuit 80. The signal REQ may include one or more address bits. A signal (e.g., DATA) may be one or more data portions received by the circuit 60.

The circuit 60 is shown implemented as a host circuit. The circuit 70 reads and writes data to and from the circuit 80. The circuit 80 is generally implemented as a nonvolatile memory circuit. The circuit 80 may include a number of modules 82a-82n. The modules 82a-82n may be implemented as NAND flash chips. In some embodiments, the circuit 80 may be a NAND flash device. In other embodiments, the circuit 70 and/or the circuit 80 may be implemented as all or a portion of a solid state drive 90 having one or more nonvolatile devices. The circuit 80 is generally operational to store data in a nonvolatile condition. When data is read from the circuit 80, the circuit 70 may access a set of data (e.g., multiple bits) identified in the signal REQ. The signal REQ may request data from the drive 90 or from one of a number of additional storage devices.

Data within the circuit 80 is generally organized in a hierarchy of units. A first type of redundancy may be implemented as a redundancy block. A redundancy block is a combination of blocks (e.g., a block from each nonvolatile memory die in the circuit 80) that can be combined to form a redundant array of silicon independent elements, similar to a redundant array of independent disks for magnetic media. The nonvolatile memory locations within the blocks may be written in a striped fashion. In some embodiments, organizing a plurality of blocks in redundancy blocks reduces an overhead of block management. A block is generally considered a smallest quantum of erasing. A page is generally considered a smallest quantum of writing. A read unit (or codeword or Epage or ECC-page) is a smallest correctable quantum of reading and/or error correction. Each block includes an integer number of pages. Each page includes an integral number of read units.

In some embodiments, the circuit 80 may be implemented as a single-level cell (e.g., SLC) type circuit. An SLC type circuit generally stores a single bit per memory cell (e.g., a logical 0 or 1). In other embodiments, the circuit 80 may be implemented as a multi-level cell (e.g., MLC) type circuit. An MLC type circuit is generally capable of storing multiple (e.g., two) bits per memory cell (e.g., logical 00, 01, 10 or 11). In still other embodiments, the circuit 80 may implement a triple-level cell (e.g., TLC) type circuit. A TLC circuit may be able to store multiple (e.g., three) bits per memory cell (e.g., a logical 000, 001, 010, 011, 100, 101, 110 or 111).

In general, the controller 70 may include an erase/program unit that may implement redundancy across the modules 82a-82n. For example, multiple blocks may be read from multiple dies 82a-82n. The erase/program unit may be implemented as part of the firmware (or logic) 100.

The drive 90 contains multiple NAND Flash or memory modules 82a-82n. Each of the memory modules may be fabricated as one or more dies (e.g., 1, 2, 4, 8, etc.). The die (or modules) 82a-82n may operate to read or to write concurrently. The read and write bandwidth depends on how many of the die 82a-82n are implemented, as well as the bandwidth of each of the dies 82a-82n. If the SSD drive 90 receives a host command REQ, in order to achieve the best performance, and/or to address wear leveling issues, the drive 90 will walk through all of the dies 82a-82n (e.g., a first page of DIE0, DIE1 . . . DIEn, then a next page of DIE0).

In an example where each of the NAND die 82a-82n are each 8 GB, a 256 GB capacity drive needs 32 NAND die. If one of the NAND die 82a-82n is used for redundancy, then 31 are available for all other storage (e.g., user data plus system data (such as mapping data)), etc. The total number of die 82a-82n implemented is normally a power of 2 (e.g., 4, 8, 16, 32, etc.). Implementing 33 NAND die is generally not practical, since an extra placement, and associated cost, would be needed on the circuit 80. Furthermore, the NAND die 82a-82n are generally manufactured in multi-die packages in powers of 2 (e.g., two, four, eight, etc., die per package). As a practical matter when implementing the drive 90, without the circuit 110, 32 die would generate 31 die space of usable storage space.

In a 32 die example, one redundant NAND die would consume 1/32 of the storage space of the drive 90, or about 3.125%. In a 128GB implementation, sixteen 8GB NAND die may be implemented. In such an example, a single redundant die would use 1/16=~6.25% of the storage capacity of the drive 90. Such an implementation would drive over provisioning overhead higher to leave enough extra capacity for system data. The problem is exaggerated for lower capacity drives. Since only a handful of users actually consume a significant part of the physical space of the drive 90, the adjustable redundancy provided by the circuits 100 and/or 110 would benefit most users with little down side. A typical operating system tends to generate warnings when free drive space is low (e.g., below 15%), so users tend to naturally leave a significant amount of free space. Such implementations benefit from the elastic (or variable) redundancy scheme provided.

In some embodiments the above is true even if user did fill the drive 90 to the top of the logical capacity (e.g., for all Logical Block Addresses—LBAs—up to MAX_LBA value, reported by the drive 90 to the host 60). In such embodiments, data may be compressed before being written to the memory 80, thus occupying only a fraction of physical space of the drive 90.

To maximize the usable space on the drive 90, the controller 70 implements a variable redundancy to reduce the overall redundancy overhead. The controller 70 may selectively protect portions of user data when drive space usage is high while still offering the full redundancy protection benefits for the entire user data as long as the physical space usage is below a certain predefined limit.

Redundancy is used for higher-level error correction. When writing pages in each of the NAND die 82a-82n, a first-level error-correcting code (such as a BCH or LDPC code) is used to protect the data within the individual pages. The redundancy may be implemented as orthogonal, second level of redundancy applied across a number of pages (generally from a different one of the NAND die 82a-82n) to permit recovery from various error conditions.

For example, errors may include a page that is uncorrectable because of too many accumulated errors for the first-level error-correcting code to correct. A word line in one of the die fails, rendering a portion of the data in that die, such as a page, inaccessible. A block in one die fails, rendering the data in the block inaccessible. An entire die fails, rending all data in the die inaccessible. Except for the first type of error, the other failure types above are considered physical failure mechanisms, and are generally hard (persistent) errors.

In some embodiments, the redundancy may use an error-correcting code. In other embodiments, the redundancy uses an erasure-correcting code since a location of the error(s) is known (e.g., the pages or portions thereof that failed to be corrected by the first-level error correcting code). For example, a simple parity (XOR) code can correct 1 erasure using 1 redundant position out of n. Reed-Solomon (RS) codes can be used to correct erasures, and an RS code using j redundant positions out of n can correct j erasures. Other erasure correcting techniques, such as those described in co-pending international application WO2012/099937, filed Jul. 26, 2012, entitled "HIGHER-LEVEL REDUNDANCY INFORMATION COMPUTATION", may be implemented and are incorporated by reference.

Figure 2:
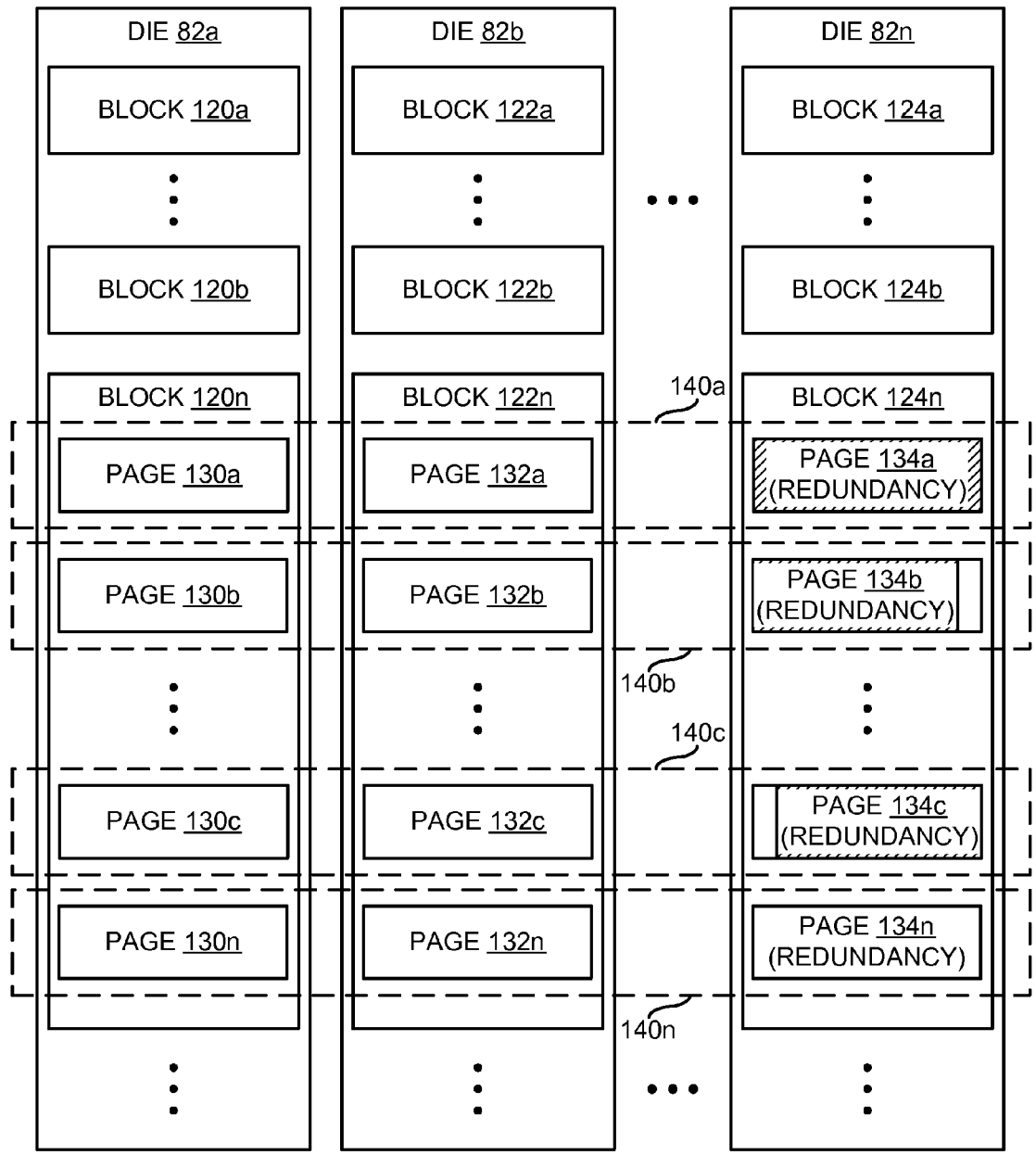
FIG. 2 is a diagram of a redundancy scheme.

Referring to FIG. 2, a diagram of the die 82a-82n is shown implemented in a "striped" fashion. The die 82a is shown having a number of blocks 120a-120n. The die 82b is shown having a number of blocks 122a-122n. Similarly, the die 82n is shown having a number of blocks 124a-124n. The particular number of blocks in each of the die 82a-82n may be varied to meet the design criteria of a particular implementation. The block 120n is shown having a number of pages 130a-130n. Similarly, the block 122n is shown having a number of pages 132a-132n. The block 124n is shown having a number of pages 134a-134n. A number of stripes 140a-140n are shown. The stripe 140a is shown comprising the page 130a, 132a, and 134a. The page 134a is shown implemented as a redundancy page. One page from each of the NAND die 82a-82n is written in a determined order, wrapping around to write the next page in each of the die 82a-82n, until one block of each of the NAND die 82a-82n is full. The redundancy shown has been applied in a "die first, page second, block third" order that fills one block from each die before storing data into a second block in each die.

Because the striping order fills an entire block in each of the die 82a-82n before writing to a second block in each of the die 82a-82n in a full redundancy scheme (e.g., collection of all blocks with the same block number from all of the die), block failures can normally only be handled with a full die of redundancy −1 die out of n dedicated to storing the redundancy overhead. Or equivalently, $1/n^{th}$ of the capacity distributed among the die 82a-82n.

As discussed above, using 1 die out of n (or the equivalent in capacity distributed among the die) to store redundancy information for recovery of block failures has a theoretical overhead of 1/n. In a small-capacity drive 90 where n is small, the overhead becomes a higher percentage of the capacity, driving up the over provisioning space used.

In general, only a small part of the physical space of the drive 90 is actually filled by valid user data. Drive usage may reflect the tendency of users to not fill the drive 90 to a logical capacity. Data compression may also keep overall usage of space on the drive 90 down. At the same time, in each redundancy stripe, only part of the redundancy information, proportional to amount of valid user data in the same stripe is actually stored. The rest of the space normally reserved for redundancy information can be considered and used as part of the free space of the drive 90. During recycling, or garbage collection, only redundancy information for valid user data will be recreated.

The stripe 140a represents an example of the stripe with 100% valid user data (shaded pages). The entire redundancy page is shown as being in use. When a stripe will be rewritten (e.g., due to recycling for wear leveling) the entire redundancy page will be recreated on the new location.

The stripes 140b and 140c are shown having only a percentage (e.g., 50%) use of user data space (e.g., the rest of the space is stale data, old copies of LBAs, rewritten elsewhere). When the stripes 140b and 140c will be overwritten, the overwritten portions of the stripes 140b and 140c will together occupy only 1 stripe in a new location (e.g., stored as the same stripe or as stripes shared with other data). So these 2 stripes (e.g., 140b and 140c) together will recreate only one page worth of redundancy data, occupying around 50% of a page each. Finally, the stripe 140n is shown not having any valid user data. The redundancy page 134n is shown completely free.

In many embodiments, the drive 90 may have a physical capacity P with 1 die out of n dedicated to storing the redundancy overhead. If U bytes of data are written as user data, all with redundancy, the redundancy will consume $$R = U/(n-1) \text{ bytes} \quad (1)$$

In each redundancy stripe 1, redundancy page is used for N−1 user data pages.
For example, consider:

$$U = k*P \quad (2)$$

where k is a number between 0 and (n−1)/n. The value k reflects a portion of the entire drive capacity that is filled by user data (which will be protected by redundancy). The associated redundancy data consumes:

$$R = k*P/(n-1) \text{ bytes} \quad (3)$$

The goal is to keep redundancy usage below a certain limit RL (e.g., 5% of the total capacity P) to be able to "hide" the redundancy in the reasonably low over provisioning overhead.
For example, if:
RL=r*P where 0<=r<=1/n is relative media usage by the redundancy.

Then a maximum value of k used while still having all user data protected by redundancy can be calculated as function of n and target value r from the following equation (3)

$$RL = R \text{ or } r*P = k*P/(n-1), \text{ so } k = r*(n-1) \quad (4)$$

The maximum amount of user data which can be written with redundancy is:

$$U_{max} = k*P = r*(n-1)*P \quad (5)$$

In the following TABLE 1, the value k is calculated as a function of n and r.

TABLE 1

| | r | | | |
|---|---|---|---|---|
| n | 0.02 | 0.04 | 0.08 | 0.10 |
| 2 | 0.02 | 0.04 | 0.08 | 0.10 |
| 4 | 0.06 | 0.12 | 0.24 | 0.30 |
| 8 | 0.14 | 0.28 | 0.56 | 0.70 |
| 12 | 0.22 | 0.44 | 0.88 | 0.92 |
| 16 | 0.30 | 0.60 | 0.94 | 0.94 |
| 24 | 0.46 | 0.92 | 0.96 | 0.96 |
| 32 | 0.62 | 0.97 | 0.97 | 0.97 |
| 48 | 0.94 | 0.98 | 0.98 | 0.98 |
| 64 | 0.98 | 0.98 | 0.98 | 0.98 |
| 128 | 0.99 | 0.99 | 0.99 | 0.99 |

For a wide range of values (n, r) a healthy share of drive capacity (e.g., 50-70%) can be filled by user data with full redundancy protection. Further, the value of 'n' (e.g., nominally the number of die 82a-82n) may be treated as doubled if redundancy protects twice as many blocks (e.g., using fractional redundancy ½), or quadrupled if redundancy protects four times as many blocks (e.g., fractional redundancy ¼). Fractional redundancy may be implemented in accordance with co-pending application Ser. No. 13/675,874 which is incorporated by reference.

In some embodiments, the value n is not necessarily the same for all of the redundancy stripes 140a-140n. In various embodiments, the positions of the redundancy die can be also different in different redundancy stripes. In further embodiments, both the value n as well as an actual position of the redundancy dies' change from stripe to stripe according to various rules.

In the various examples described, the amount of user data which can be written to the drive 90 with redundancy is normally maximized, while still keeping redundancy usage below a certain amount Umax. As long as a user does not increase physical space usage above Umax, the entire user data can be written with full redundancy.

Figure 3:
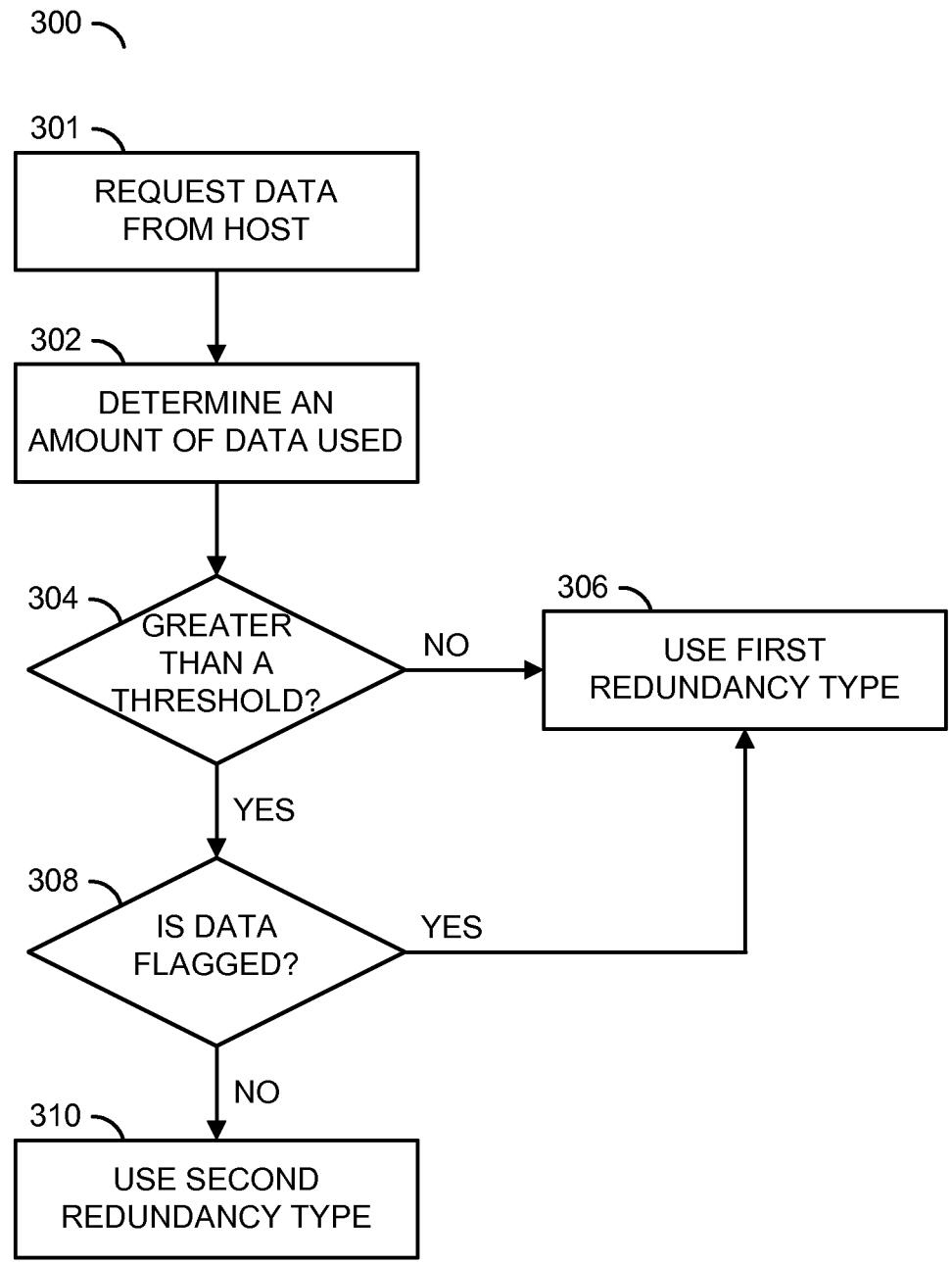
FIG. 3 is a flow diagram illustrating a process for protecting data.

Referring to FIG. 3, a flow diagram 300 is shown. The method 300 generally comprises a step (or state) 301, a step (or state) 302, a decision step (or state) 304, a step (or state) 306, a decision step (or state) 308, and a step (or state) 310. The step 301 may request data from the host 60. The step 302 may determine an amount of space currently used to store data received from the host 60. The decision step 304 may determine whether the amount of data used is greater than a threshold. If not, the method 300 moves to the state 306. In the state 306, the method 300 uses a first redundancy type. If the decision state 304 determines that the data is greater than a threshold, the method moves to the state 308. The decision state 308 determines if the data has been flagged. If so, the method 300 moves to the state 306, which uses the first redundancy type. If not, the method 300 moves to the state 310 which uses a second redundancy type. The second redundancy type may be no redundancy at all, or a very low overhead type of redundancy. The second redundancy type is generally less robust than the first redundancy type. The type of data flagged by the decision state 308 may be particularly user critical data.

If a user writes more data than allowed for certain (n, r) values by formulas above (more than Umax), some part of the data must be written without redundancy protection (otherwise target r value will be tipped over).

In some embodiments all user data above Umax limit will be written without redundancy. This is the simplest approach and if actual failure happens in the redundancy protected stripe recovery is possible, otherwise not. Statistically such drive is much better off than the alternative of a drive without redundancy at all. Such an approach provides more capacity and/or better performance than other alternatives, such as a drive with fully protected data.

In further embodiments when later in drive lifetime user data space usage falls below the limit Umax due to rewriting some LBAs with more compressible data or due to trimming some part of it, parts of user data, written without redundancy, can then be overwritten (recycled) with redundancy.

In other embodiments user can configure drive, dividing all LBAs on "important" and "not-so-important" regions. As long as "important" LBAs do not consume more than the Umax physical space, they will all be protected by redundancy.

In many embodiments data which stays intact longer ("cold" data) will be given preference in redundancy protection (this data will be written with redundancy whenever possible) because it is generally considered more vulnerable. Cold data may be considered data that has not been changed for a predetermined time.

In some embodiments all user data above Umax limit will be written without redundancy. Writing without redundancy may be the simplest approach and if actual failure happens in the redundancy protected stripe recovery is possible, otherwise recovery may not be possible. Statistically, the drive 90 may be much better off than the alternative of a drive without redundancy at all. The drive 90 may provide more capacity and/or better performance than other alternatives, such as a drive with fully protected data.

In further embodiments, when in a later lifetime of the drive 90, user data space usage may fall below the limit Umax due to rewriting some LBAs with more compressible data or due to trimming some part of the user data. Parts of the user data, written without redundancy, may then be overwritten (recycled) with redundancy.

In other embodiments, the user may configure the drive 90. For example, by dividing all LBAs on "important" and "not-so-important" regions. As long as "important" LBAs do not consume more than the Umax physical space, they will all be protected by redundancy.

In many embodiments data which stays intact longer ("cold" data) may be given preference in redundancy protection (this data will be written with redundancy whenever possible). Cold data is generally considered more vulnerable. Cold data may be considered data that has not been changed for a predetermined amount of time.

Practical implementations may differ in selecting boundaries where a redundancy mode changes, the way redundancy changes (turned ON/OFF or just n value and die position(s) change) and the way information about redundancy is stored. Information about redundancy is stored somehow—since data from a page cannot be read properly unless all redundancy die locations are known, even if there is no actual failure for which redundancy recovery will be applied.

In general, redundancy information is only changed on a redundancy stripe or page boundary. For example, while the entire redundancy stripe must be written with the same redundancy configuration, a next redundancy stripe might have other redundancy settings.

In some embodiments, the redundancy behavior may be changed on the stripe or page boundary (e.g., a trigger for change would be an amount of data written and/or the data type). In some embodiments, a system may have enough memory to store locations and types of all redundancy changes which is necessary to read data later. In other embodiments, redundancy settings may be changed once per block to reduce the amount of information which needs to be stored.

In further embodiments, redundancy settings may be set to change only from ON to OFF and vice versa and on a block boundary. For example, settings for an entire redundancy block are the same and there are only two possible sets of redundancy blocks. Such an implementation may reduce storage requirements (e.g., to track where redundancy is used) even more (e.g., where 1 bit per redundancy block is used).

The functions performed by the diagram of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a memory configured to store data, the memory comprising a plurality of memory modules each having a size less than a total size of the memory; and
    a controller configured to process a plurality of read/write operations to/from the memory and select between (a) using a first redundancy scheme on user data to be stored across the memory modules when an amount of the memory that would be occupied by the user data and previously stored data is less than a predetermined threshold capacity of the memory and (b) using a second redundancy scheme on all or a portion of the user data to be stored across the memory modules when the amount of the memory that would be occupied by the user data and the previously stored data is greater than the predetermined threshold capacity of the memory, wherein the second redundancy scheme protects less than all of the data written using the second redundancy scheme and data that has not changed for a predetermined amount of time is given preference to be selected for protection by the first redundancy scheme over data that has changed within the predetermined amount of time.

2. The apparatus according to claim 1, wherein:
    the first redundancy scheme comprises a high level redundancy; and
    the second redundancy comprises a low level redundancy.

3. The apparatus according to claim 1, wherein (i) the second redundancy scheme comprises writing the user data with no redundancy and (ii) the controller writes to either a portion of the memory with the first redundancy scheme or a portion of the memory with no redundancy.

4. The apparatus according to claim 1, wherein the first redundancy scheme fully protects the data.

5. The apparatus according to claim 1, wherein (i) the memory modules are memory dies, (ii) at least one of the first redundancy scheme and the second redundancy scheme is configured to protect the data using one of the memory dies configured to store redundancy information for a respective stripe of the data and (iii) the stripe of the data is stored across a plurality of the memory dies.

6. The apparatus according to claim 5, wherein the redundancy information comprises at least one of a parity code and a Reed-Solomon code.

7. The apparatus according to claim 5, wherein only redundancy information for data considered to be valid is recreated during at least one of recycling and garbage collection.

8. The apparatus according to claim 7, wherein (i) portions of a first stripe having the data considered to be valid and portions of a second stripe having the data considered to be valid are combined to create a combined stripe and (ii) one of the memory dies used for the combined stripe stores the redundancy information for the combined stripe.

9. The apparatus according to claim 1, wherein the data stored using the second redundancy scheme is recycled and stored using the first redundancy scheme after the amount of the memory occupied by the stored data is less than the predetermined threshold capacity of the memory.

10. The apparatus according to claim 1, wherein the apparatus is a solid-state drive configured to implement a variable redundancy across the memory modules within the solid-state drive and the predetermined threshold capacity is determined based upon the number of memory modules, a first value representing a portion of the entire memory that is to be filled with user data while being protected by the first redundancy scheme, and a second value representing a target amount of the entire memory to be used for redundancy.

11. An apparatus comprising:
    an interface configured to (a) connect to a memory and (b) process a plurality of read/write operations, the memory comprising a plurality of memory modules each having a size less than a total size of the memory; and
    a processor configured to select between (a) using a first redundancy scheme on user data to be stored across the memory modules when an amount of the memory that would be occupied by the user data and previously stored data is less than a predetermined threshold capacity of the memory and (b) using a second redundancy scheme on all or a portion of the user data to be written across the memory modules when the amount of the memory that would be occupied by the user data and the previously stored data is greater than the predetermined threshold capacity of the memory, wherein the second redundancy scheme protects less than all of the data written using the second redundancy scheme and data that has not changed for a predetermined amount of time is given preference to be selected for protection by the first redundancy scheme over data that has changed within the predetermined amount of time.

12. The apparatus according to claim 11, wherein (A) the second redundancy scheme protects a first portion of the user data with redundancy and a second portion of the user data is stored without redundancy and (B) a determination of the first portion of the user data and the second portion of the user data is based on a particular data type.

13. The apparatus according to claim 12, wherein the first portion of the user data comprises recycled data that has not been changed for a predetermined amount of time.

14. The apparatus according to claim 12, wherein the first portion of the user data comprises data marked by a user as being important.

15. The apparatus according to claim 12, wherein the particular data type is cold data.

16. The apparatus according to claim 11, wherein (A) the second redundancy scheme protects a first portion of the user data with redundancy and a second portion of the user data is stored without redundancy and (B) a determination of the first portion of the user data and the second portion of the user data is based on a logical location of the user data.

17. The apparatus of claim 11, wherein redundancy settings are different for different parts of the user data written with redundancy.

18. The apparatus according to claim 11, wherein the memory comprises a flash memory.

19. A method for storing data, comprising:
processing a plurality of read/write operations to/from a memory, the memory comprising a plurality of memory modules each having a size less than a total size of the memory; and
selecting between a plurality of redundancy schemes, wherein (a) a first of the redundancy schemes stores user data to be written across the memory modules with full protection when an amount of the memory that would be occupied by the user data and previously stored data is less than a predetermined threshold capacity of the memory, (b) a second of the redundancy schemes stores the user data to be written across the memory modules with less than all of the user data protected when the amount of the memory that would be occupied by the user data and the previously stored data is greater than the predetermined threshold capacity of the memory, and (c) data that has not changed for a predetermined amount of time is given preference to be selected for protection by the first redundancy scheme over data that has changed within the predetermined amount of time.

20. The method according to claim 19, wherein the method implements a variable redundancy across the memory modules within a solid-state drive and the predetermined threshold capacity is determined based upon the number of memory modules, a first value representing a portion of the entire memory that is to be filled with user data while being protected by the first redundancy scheme, and a second value representing a target amount of the entire memory to be used for redundancy.

* * * * *